United States Patent [19]

Yamagishi et al.

[11] Patent Number: 4,925,262
[45] Date of Patent: May 15, 1990

[54] METHOD AND APPARATUS FOR LIGHT BEAM SCANNING USING A HOLOGRAM

[75] Inventors: Fumio Yamagishi, Ebina; Shinya Hasegawa, Machida; Hiroyuki Ikeda, Yokohama, all of Japan

[73] Assignee: Fujitsu Limited, Kawasaki, Japan

[21] Appl. No.: 273,624

[22] Filed: Nov. 17, 1988

Related U.S. Application Data

[63] Continuation of Ser. No. 82,947, Aug. 5, 1987, abandoned, which is a continuation of Ser. No. 599,243, Apr. 11, 1984, abandoned.

[30] Foreign Application Priority Data

Apr. 13, 1983 [JP] Japan ............................ 58-66145

[51] Int. Cl.$^5$ .................................................. G02B 26/10
[52] U.S. Cl. .................................... 350/3.71; 350/3.7
[58] Field of Search ............................................ 350/3.71

[56] References Cited

U.S. PATENT DOCUMENTS

| | | | |
|---|---|---|---|
| 4,239,326 | 12/1980 | Kramer | 350/3.71 |
| 4,639,071 | 1/1987 | Matsumoto et al. | 350/3.71 |

FOREIGN PATENT DOCUMENTS

| | | | |
|---|---|---|---|
| 0041845 | of 0000 | European Pat. Off. | |
| 54-10484 | 8/1979 | Japan | |
| 0047019 | 4/1981 | Japan | 350/3.71 |
| 57-2018 | 1/1982 | Japan | |
| 2024449 | 1/1980 | United Kingdom | |

OTHER PUBLICATIONS

Dickson, L. D., "Correction of Astigmatism for Off-Axis Reconstruction Beam Holographic Defletor", IBM Tech Disc. Bull., vol. 23, No. 9, Feb. 1981, pp. 4255-4256.

Ih, C. C. et al., "Method for Eccentricity Compensation for Holographic Scanners", IBM Tech. Disclosure Bull., vol. 25, No. 7B, Dec. 1982, pp. 3702-3703.

IBM Technical Disclosure Bulletin, "Correction of Astigmatism for Off/Axis Reconstruction Beam Holographic Deflection", Vol. 23, No. 9, Feb. 1981.

*Primary Examiner*—Bruce Y. Arnold
*Assistant Examiner*—David R. Parsons
*Attorney, Agent, or Firm*—Staas & Halsey

[57] ABSTRACT

A method for constructing a hologram on a transparent disk which includes two steps. First, irradiating a reference wave light beam having a diverging spherical wave front from a first point light source located at a predetermined distance on a center axis of the transparent disk. Second, irradiating an object wave light beam having a diverging spherical wave front from a second point light source located at a predetermined distance on a normal line away from a predetermined distance from the center axis. The result is interference between the reference wave light beam irradiated by the first point light source and the object wave light beam irradiated by the second point light source on the transparent disk and the formation of interference fringes having an extreme value of a spatial frequency as a hologram in one embodiment, a reconstruction beam is irradiated to the position, or in the vicinity of the extreme value.

18 Claims, 8 Drawing Sheets

Fig. 3(A) PRIOR ART
Fig. 3(B) PRIOR ART
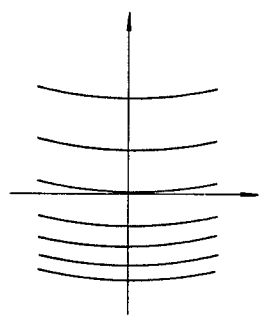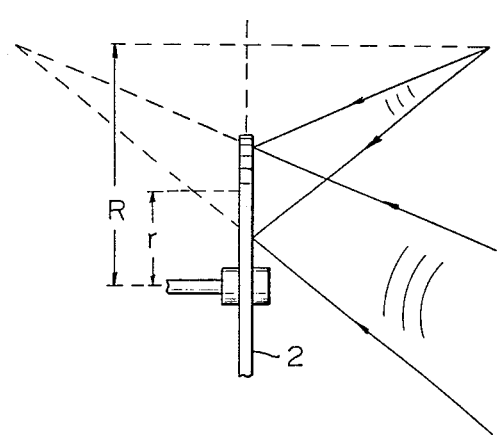
Fig. 4(A) PRIOR ART
Fig. 4(B) PRIOR ART
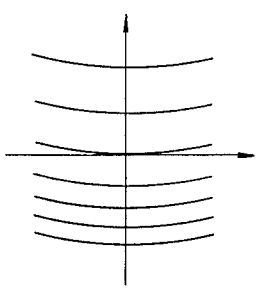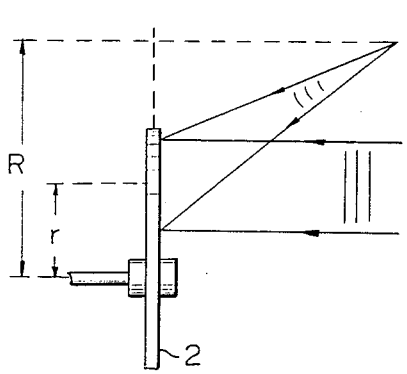

METHOD AND APPARATUS FOR LIGHT BEAM SCANNING USING A HOLOGRAM

This is a continuation of co-pending application Ser. No. 082,947, filed on Aug. 5, 1987, which is a continuation of Ser. No. 599,243, filed Apr. 11, 1984, now abandoned.

BACKGROUND OF THE INVENTION

1. Field of the Invention

The present invention relates to light beam scanning, more particularly, it relates to a method for constructing a hologram having improved interference fringes on a transparent disk, and to a method and apparatus for scanning a light beam during a reconstruction of such a hologram. The present invention is advantageous for use in a laser printer of a computer system.

2. Description of the Prior Art

Recently, laser printers are being widely used as an output apparatus in a computer system, because of their high speed and high-quality printing. These laser printers mainly consist of a laser beam source as a coherent light beam, for example, an He-Ne gas laser or a semiconductor laser, an ultrasonic light modulator, a multi-faceted rotating mirror, an fθ lens, and a drum. However, a printer using these elements, particularly the multi-faceted rotating mirror, requires a highly-complex structure and high precision assembly during manufacture. As a result, a laser printer is very expensive.

Attempts have been made by, for example, Xerox Corporation, Nippon Electric Co., Ltd., and FUJITSU LIMITED, to solve the above-mentioned problems by using a hologram instead of the multi-faceted rotating mirror in the laser printer.

However, although these attempts have achieved a simplified structure and assembly, and also reduce costs, and although they have facilitated laser use in a barcode reader of a so-called point of sales (POS) system, sufficient precision has not been obtained to enable a hologram to be used in a laser printer, while providing the precision of a conventional multi-faceted rotating mirror. This will be explained in detail hereinafter.

SUMMARY OF THE INVENTION

The primary object of the present invention is to provide a hologram having sufficient precision to make it capable of use in a laser printer.

Another object of the present invention is to provide a method for constructing a hologram having improved interference fringes.

Still another object of the present invention is to provide a method and apparatus for scanning a laser light beam during a reconstruction of a hologram used in a laser printer.

In accordance with the present invention, there is provided a method for constructing a hologram on a transparent disk which includes two steps. First, irradiating a reference wave light beam as a construction wave light beam having a diverging spherical wave front from a first point light source located at a predetermined distance on a center axis or in the vicinity of the center axis of the transparent disk. Second, irradiating an object wave light beam as a construction wave light beam having a diverging spherical wave front from a second point light source located at a predetermined distance on a normal line away from a predetermined distance from the center axis. This results in interference between the reference wave light beam irradiated by the first point light source and the object wave light beam irradiated by the second point light source on the transparent disk and the formation of interference fringes having an extreme value of a spatial frequency as a hologram. Also, a reconstruction beam is irradiated to a position, or in the vicinity of the extreme value. There is also provided a method for scanning a light beam comprising the steps of: irradiating a hologram obtained by interference of a reference wave light beam having one diverging spherical wave front and an object wave light beam having another diverging spherical wave front with a reconstruction beam, and moving the hologram, thereby obtaining a scanning light beam. According to the present invention, the reconstruction beam is irradiated to a position or in the vicinity of an extreme value under the spatial frequency with respect to an interference fringe on the hologram. Still further, there is provided an apparatus for scanning a light beam which includes: a hologram obtained by interference of a reference wave light beam and an object wave light beam, a light beam source operable to generate a reconstruction beam for irradiating the hologram, and shifting means for shifting the hologram thereby obtaining a scanning light beam. According to the present invention, the reference wave light beam and the object wave light beam have a diverging spherical wave front, and the reconstruction beam is irradiated to a position, or in the vicinity of an extreme value of spatial frequency with respect to an interference fringe on the hologram.

Thus, in accordance with the method and apparatus of a present invention, it is possible to use the hologram in a laser printer without the necessity for a complex structure and assembly, and without the requirement of high precision during manufacture.

DESCRIPTION OF THE PREFERRED EMBODIMENTS

Before describing the preferred embodiments, an explanation will be given of a light beam scanning apparatus (hereinafter called a hologram scanner) using a conventional hologram disk, and of a conventional method for constructing a hologram.

Figure 1:
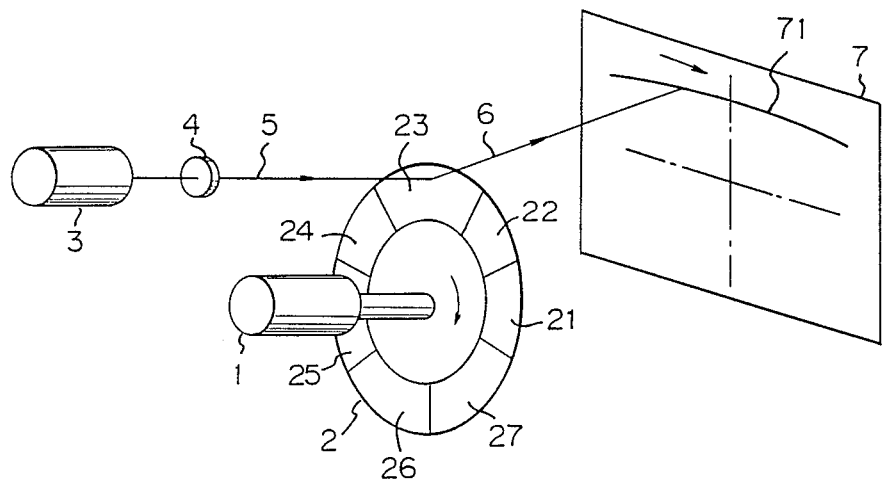
FIG. 1 is an illustration of a light beam scanning apparatus using a conventional hologram disk in a laser printer.

Referring to FIG. 1, the hologram scanner mainly includes motor 1, a hologram disk 2, a laser beam source 3, and a lens 4. The hologram disk 2 consists of transparent material and is rotated at a high speed by the motor 1. On the hologram disk 2, several holograms (21 to 27) having the same predetermined pattern are formed. A reconstruction laser beam 5 generated from the laser source 3 as a coherent light beam is irradiated to the hologram (e.g., 23) through the lens 4, and diffracted by the interference fringes of the hologram. The light beam diffracted by the interference fringes forms a scanning beam 6, and the scanning beam 6 scans on the screen 7 according to the rotation of the hologram disk 2 (in the case of a laser printer, the surface of a drum is scanned) in the direction shown by an arrow at a scanning line 71.

Figure 2A:
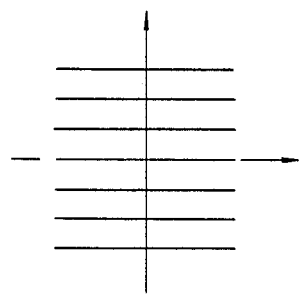
FIGS. 2(a-b), 3(a-b) and 4(a-b) illustrations of a conventional pattern of the interference fringes of the holograms used on the hologram disk shown in FIG. 1.
Figure 2B:
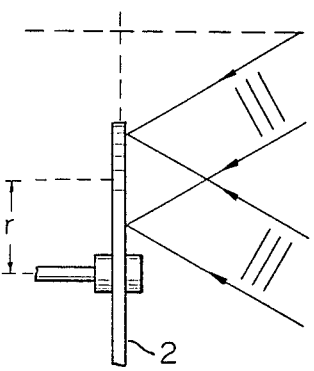

Referring to FIGS. 2 to 4, FIG. 2(A) illustrates the pattern of the interference fringes, and FIG. 2(B) illustrates a method for providing such interference fringes on the hologram disk 2. This method was disclosed by Xerox Corporation (UK. Patent Application GB No. 2024449A, Charles J. Kramer). As is obvious from the drawings, the hologram is formed by interference fringes having the same interval, as shown in FIG. 2(A). Such a hologram is obtained by the interference of two reference wave light beams each having a plane wave front. Referring to FIG. 3, the method shown in this Figure was disclosed by Nippon Electric Co. (Japanese Unexamined Patent Publication No. 54-104849). Here, the hologram is formed by interference fringes having an increased interval in the direction shown by the arrow line in FIG. 3(A). Such a hologram is obtained by the interference of two reference wave light beams, one having a diverging spherical wave surface and the other a converging spherical wave surface, as indicated in FIG. 3(B). Referring to FIG. 4, this method was disclosed by FUJITSU LIMITED (Japanese Unexamined Patent Publication No. 57-2018). In this case, the hologram is formed by a pattern of interference fringes similar to those illustrated in FIG. 3(A). However, such a hologram is obtained by the interference of two reference wave light beams, one having a diverging spherical wave front and the other a plane wave front, as shown in FIG. 4(B).

Figure 5:
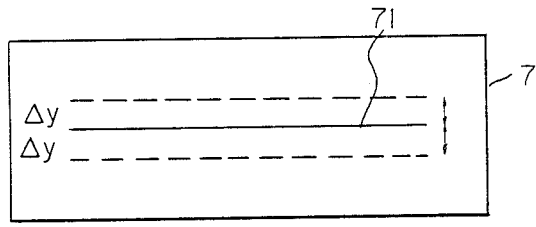
FIG. 5 illustrates the allowance width for the fluctuation of the scanning line when in use as a laser printer.

However, when the above-mentioned conventional holograms are used in the laser printer as shown in FIG. 1, the position of the scanning line 71 obtained by the scanning beam 6 on the screen 7 fluctuates at every scanning of the scanning beam 6, due to the rotation of the hologram disk. This effect stems from two factors, i.e., first, an eccentricity of the axis between the motor and the hologram disk, and second, eccentricity of axis caused by the motor vibration during rotation. This problem becomes very important when the hologram scanner is applied to a laser printer, as the laser printer requires high precision for the scanning position of the scanning beam. Namely, as shown in FIG. 5, the position of the scanning line 71 (scanning track) must be, in general, within ±25 μm of the intended position when in use in a laser printer. This means that the eccentricity of the axis between the motor 1 and the hologram disk 2 must be accurate to within ±5 to 6 μm.

However, it is impossible to achieve this positional precision using the scanning line for the above-mentioned conventional hologram, particularly for the two conventional holograms shown in FIGS. 3 and 4, for the following reasons. As is obvious from the drawings shown in FIGS. 3 and 4, in the area of the hologram irradiated by the reconstruction beam 5, the spatial frequency (number of interference fringes per unit length (mm)) continuously decreases or increases in a radial direction, as shown in FIGS. 3(A) and 4(A). When the spatial frequency continuously decreases or increases, a diffraction angle obtained between the hologram and the scanning beam 6 also continuously decreases or increases. Accordingly, when the eccentricity of the axis between the motor 1 and the hologram disk 2 occurs, the diffraction angle changes in accordance with such axis eccentricity and, consequently, fluctuation occurs in the irradiated scanning beam 6.

It is impossible to maintain the precision of the eccentricity to within ±5 to 6 μm by improving the mounting between the motor shaft and the hologram disk, by improving the eccentricity caused by motor vibration, and by improving the positioning of the pattern of the interference fringes of the hologram. In another attempt to solve the above-mentioned problems, as shown by the hologram in FIG. 2, in this method it is necessary to provide a compensating optical system, for example, an fθ lens (not shown). However, this compensating optical system is very expensive, and necessitates a complex structure.

Figure 6:
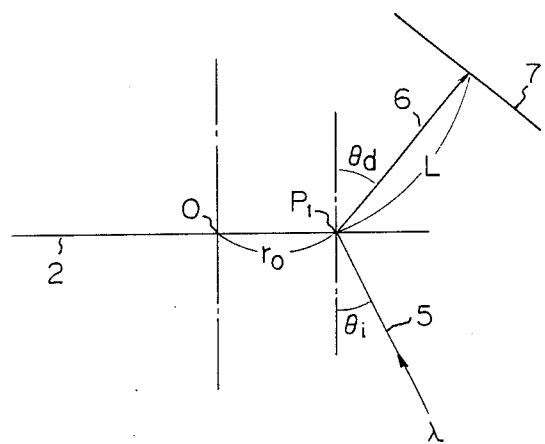
FIGS. 6 and 7 are illustrations explaining the underlying principle of a method for scanning the laser beam according to an embodiment of the present invention.

A method for constructing a hologram having improved interference fringes, and a method and apparatus for scanning the laser beam during a reconstruction of such a hologram according to an embodiment of the present invention, will now be described. Referring to FIG. 6, reference $\theta_i$ shows an incident angle of the reconstruction beam 5 irradiated from the laser beam source 3, and $\theta_d$ shows a diffraction angle obtained by the scanning beam 6. Reference O shows the center of the hologram disk 2. The reconstruction beam 5 is irradiated to the point $P_1$ of distance $r_0$ on the hologram from the center O. The scanning beam 6, diffracted by the diffraction angle $\theta_d$, is irradiated to the screen 7 over the distance L from the hologram 2.

Next, the following formula is obtained under the known laws of diffraction, $$\sin \theta_d = -\sin \theta_i + f(r_0)\lambda \quad (1)$$

where,

λ is the wavelength of the reconstruction beam and $f(r_0)$ is the spatial frequency at the point of distance $r_0$.

Figure 7:
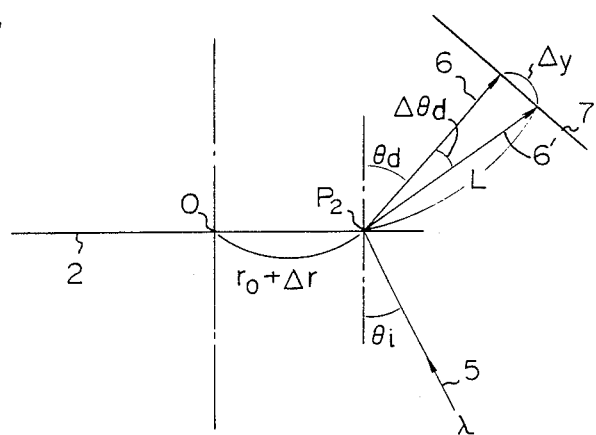

FIG. 7 illustrates when the reconstruction beam 5 is deflected only a short distance Δr from the distance $r_0$. In this case, since the incident position $P_1$ of the reconstruction beam 5 is changed to the point $P_2$ of distance $r_0+\Delta r$, the diffraction angle $\theta_d$ changes to the angle $\theta_d+\Delta\theta_d$. Therefore, the position of the scanning line 6' on the screen 7 changes to $\Delta y$, compared with the position as shown in FIG. 6.

From the above-mentioned diffraction law (1), the following formula is obtained, $$\sin(\theta_d+\Delta\theta_d) = -\sin\theta_i + f(r_0+\Delta r)\lambda \quad (2)$$

When the fluctuation of the scanning line on the screen 7 is given by $\Delta y$, the following formula is approximately obtained, $$\Delta y \approx L \cdot \Delta\theta_d \quad (3)$$

For the laser printer, it is necessary for $\Delta y$ be maintained within $\pm 25$ μm, as mentioned above, in order to obtain high quality printing.

Generally, since the laser printer prints at 240 dots per inch, the diameter of one dot is approximately 105.8 μm. Accordingly, the fluctuation $\Delta y$ must be within one quarter dot (approximately, $\pm 26$ μm).

From the above-mentioned formulae (1) (2), and (3), the following approximate formula is obtained, $$\Delta y \approx \pm \frac{\lambda \cdot L \cdot f'(r_0)}{\cos\theta_d} \cdot \Delta r \quad (4)$$

where, $f'(r_0)$ is the differential (first derivative) with respect to r of the spatial frequency. As can be understood from formula (4), to minimize $\Delta y$ against the deviation $\Delta r$, the quantity $f'(r_0)$ must be as close to zero as possible. Accordingly, if $$f'(r_0) = 0 \quad (5)$$

it is possible to obtain a minimized deflection of the scanning line which can be used as the hologram scanner, based on the above formula (5).

Figure 8:
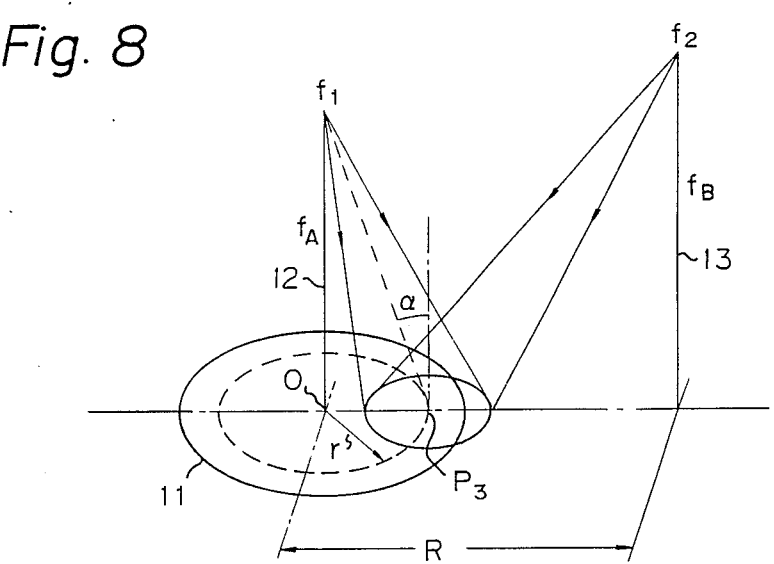
FIG. 8 is an illustration explaining a method for constructing a hologram according to one embodiment of the present invention.

For the above reasons, the principal aspect of the present invention is obtained by a solution of the formula (5). Referring to FIG. 8, reference numeral 11 shows a transparent disk material, for example, a glass disk, provided with a predetermined pattern of a hologram on the surface thereof. The hologram is obtained by interference between a reference wave light beam having a diverging spherical wave front from a focal point $f_1$ as a first point light source, located at a predetermined distance $f_A$ on the center axis 12 of the disk 11, and an object wave light beam having a similar diverging spherical wave front from a focal point $f_2$ as a second point light source, located at a predetermined distance $f_B$ on the axis 13 which is a distance R from the center axis of the disk 11.

Figure 9A:
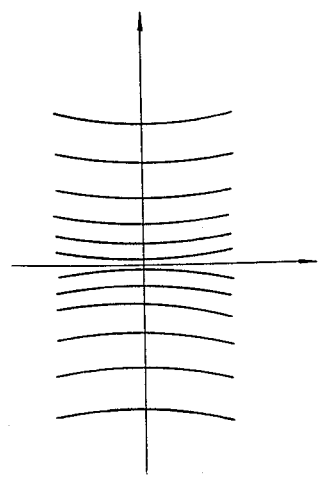
FIG. 9A is an illustration of the pattern of the interference fringes of the hologram according to the embodiment of FIG. 8.
Figure 9B:
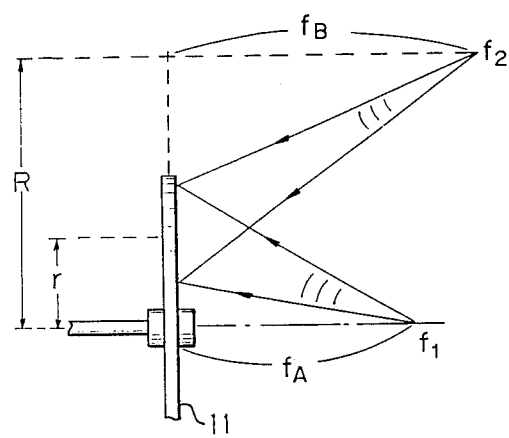
FIG. 9B is a side view of FIG. 8.

The interference fringes obtained from the above method are illustrated in FIG. 9(A). As is obvious from the drawing, the interference fringes are fine or close together toward the center of the hologram and coarse or wider toward both inner and outer sides of the hologram. Accordingly, the center of the hologram has a high spatial frequency and both the inner and outer sides of the hologram have a low spatial frequency.

In the hologram disk 11 having improved interference fringes obtained from the above method, the reconstruction laser beam is irradiated toward the hologram at the distance r from the center O of the hologram disk 11.

In this case, the spatial frequency f at a distance r is obtained by the following formula, $$f = \frac{1}{\lambda_1}\left(\frac{r}{\sqrt{f_A^2+r^2}} + \frac{R-r}{\sqrt{f_B^2+(R-r)^2}}\right) \quad (6)$$

where, $\lambda_1$ is a construction wavelength i.e. the wavelength of the construction laser beam. The formula (6) is differentiated with respect to r, and the condition of $f'(r)=0$, i.e., the condition having the extreme value of the spatial frequency, is obtained by the following formula, $$\frac{f_A^2}{(r^2+f_A^2)^{3/2}} = \frac{f_B^2}{\{(R-r)^2+f_B^2\}^{3/2}} \quad (7)$$

Accordingly, the preferred incident position $r_0$ of the reconstruction laser beam from the center O is obtained by the distance r sufficient to satisfy the formula (7) (if the incident position $r_0$ is fixed, the distance $f_A$ is chosen to satisfy formula (7)).

Figure 10:
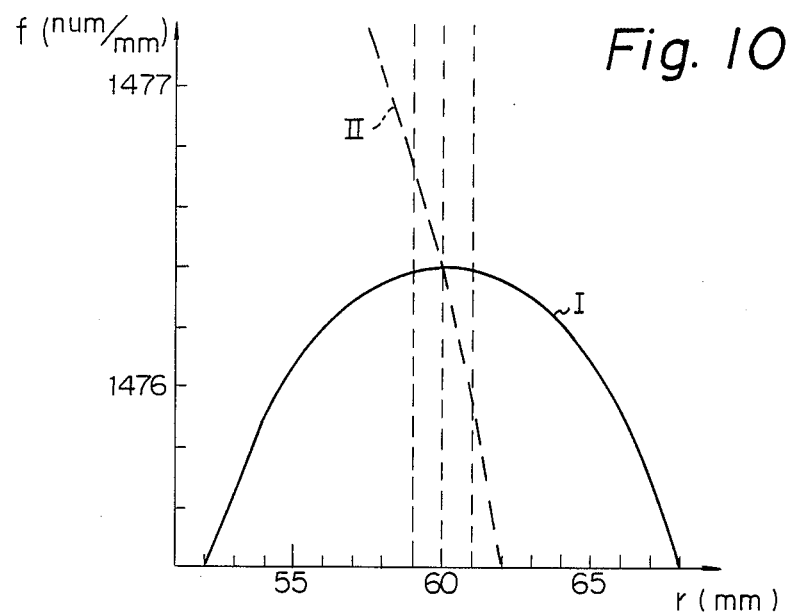
FIG. 10 is a graph of the relationship between the spatial frequency and the incident position of the reconstruction beam indicated with the distance from the center of the hologram disk in comparison with the spatial frequency of the conventional method as shown in FIGS. 2 to 4.

As can be understood from formula (4), when the reconstruction laser beam is irradiated to pass through the glass disk 11 at the position $P_3$ which is at the distance $r_0$ from the center O, even if the incident position of the reconstruction beam becomes slightly shifted from the position $P_3$, since the change of spatial frequency based on the interference fringes shown in FIG. 9(A) have an extreme (in this case a maximum) value as shown in FIG. 10, there is little fluctuation of the scanning beam diffracted by the hologram on the screen.

Referring to FIG. 10, the longitudinal axis (ordinate) indicates the spatial frequency f in number per unit mm, and the transverse axis (abscissa) indicates the distance r from the center of the hologram disk. Curve I (solid line) indicates the spatial frequency according to the hologram of the present invention, and curve II (dotted line) indicates that of the prior art. As can be seen in FIG. 10, in this embodiment, the extreme value of the spatial frequency exists between the distance $r=59$ mm and $r=61$ mm from the center of the hologram disk. Thus it is clear that there is little change of the spatial frequency within this range. Therefore, when the reconstruction laser beam passes through the hologram disk within this range, i.e., between the distance $r=59$ mm and $r=61$ mm from the center of the hologram disk since there is little change of the diffraction angle $\theta_d$, there is also little fluctuation of the position of the scanning line on the screen. Further, since the curve II of the conventional method shows a large change of the spatial frequency over the distance $r=59$ to $r=61$, the change of the diffraction angle $\theta_d$ is also large, and, consequently, there is a large fluctuation of the position of the scanning line on the screen.

Figure 11:
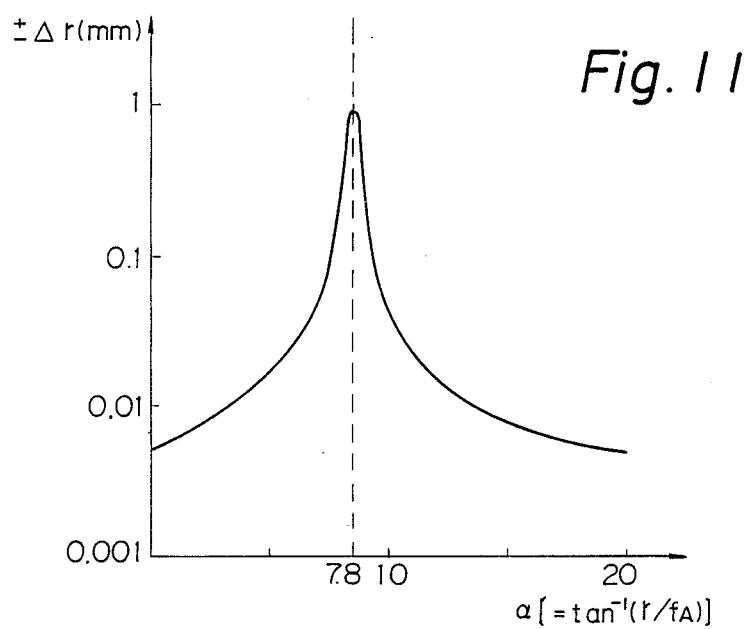
FIG. 11 is a graph of scanning allowance versus the incidence angle of the reference beam according to one embodiment of the present invention.

Next, the effect according to this embodiment will be described for one example. A hologram was constructed according to the following dimensions in FIG. 8: $\lambda_1=488$ nm (wavelength of the construction wave laser beam using an Argon laser beam), $f_A=438$ mm (the distance from the center of the hologram disk to the focal point $f_1$), $f_B=240$ mm (the distance from the transverse axis of the hologram to the focal point $f_2$ of the object wave), and $R=233$ mm. The wavelength of the reconstruction laser beam (semiconductor laser) was $\lambda_2=760$ nm, and was irradiated to pass through the hologram at the position $r=60$ mm distant from the center of the hologram. When the distance between the hologram disk and the screen was L=468 mm, the effect of the present invention is as shown in FIG. 11. Referring to FIG. 11, the longitudinal axis indicates the allowance value ($\Delta r$) of the eccentricity at the center of the hologram disk, and the transverse axis indicates the incident angle ($\alpha$) of the reference wave (construction wave) laser beam (FIG. 8), i.e., $\alpha = \tan^{-1}(r/f_A)$. As the curve clearly shows, at the point $\alpha = 7.8°$, i.e., $f_A = 438$ mm, r=60 mm, the allowance value ($\Delta r$) of the eccentricity indicates the maximum allowance value ($\Delta r = \pm 1$ mm). Accordingly, to maintain the fluctuation of the scanning line within $\pm 25$ μm when in use as a laser printer, the allowance value of the eccentricity between the motor axis and the center of the hologram disk is only just sufficient, i.e., the allowance value is r=±1 mm. As mentioned in the above embodiment, straight line scanning is possible by making the wavelength of the reconstruction laser beam $\lambda_2$ longer than the wavelength of the construction wave laser beam $\lambda_1$.

Another embodiment of the method for constructing a hologram according to the present invention will now be explained. The method of this embodiment can solve not only the problem of eccentricity of the axis between the motor axis and the center of the hologram disk, but also the change in the hologram disk orientation due to wobble.

Figure 12:
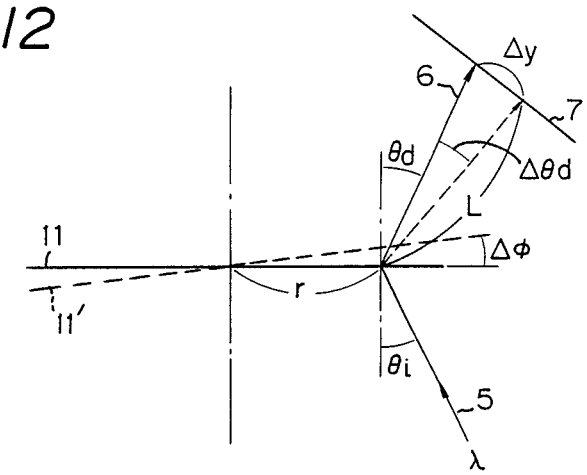
FIG. 12 is an illustration explaining the deflection of the surface of the hologram disk.

Referring to FIG. 12, assume that the hologram disk 11 is deflected to the position indicated by hologram disk 11' by the deflection angle $\Delta\Phi$ with respect to the center axis. Then, as shown in FIG. 12, the fluctuation of the scanning line on the screen 7 is $\Delta y$, and the deflection angle of the diffraction angle $\theta_d$ is the angle $\Delta\theta_d$. Also, the incident angle of the reconstruction laser beam having the wavelength $\lambda$ is the angle $\theta_i$.

As explained in the first embodiment, the fluctuation of the scanning line $\Delta y$ is given by the formula (3). Accordingly, the deflection angle $\Delta\theta_d$ is obtained from the following calculation, $$|\theta_d| < \frac{0.026}{450} \times \frac{180}{\pi} \approx 3.3 \times 10^{-3} \text{ (deg)}$$
$$= 11.88(\text{sec}) \approx 12(\text{sec})$$

where, the distance L between the hologram disk and the screen is 450 mm, and the allowance value of the fluctuation of the scanning line is 26 μm. The above calculation clearly shows that, in the first embodiment, the allowance value of the deflection angle must be within the angle 12 (sec) of the deflection angle $\Delta\theta_d$.

The relationship between the angle $\Delta\theta_d$ and the angle $\Delta\phi$ is given by the following first approximate formula, $$d\theta_d \approx 1 - \left(\frac{\cos\theta_i}{\cos\theta_d}\right) d\phi \quad (8)$$

As can be understood from the above formula (8), the maximum allowance value of the deflection angle $d\phi_d$ is obtained when the incident angle $\theta_i$ is equal to the diffraction angle $\theta_d$, to obtain the maximum margin for the allowance value for the deflection of the surface of the hologram disk.

Figure 13:
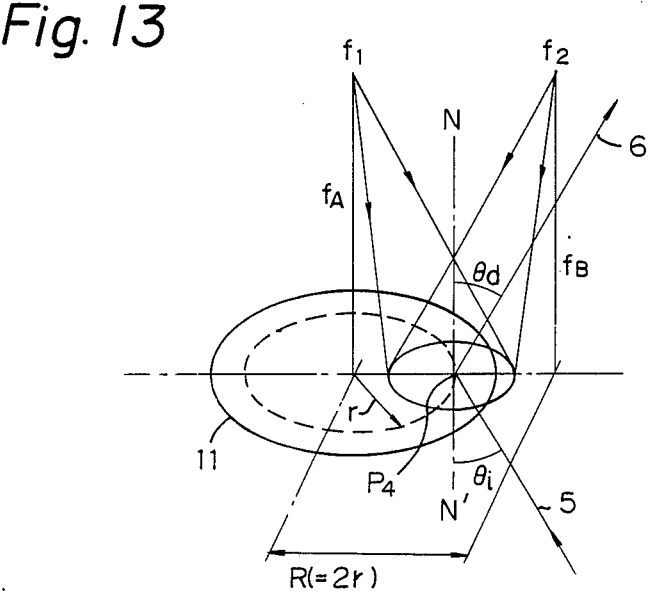
FIG. 13 is an illustration explaining a method for constructing a hologram according to another embodiment of the present invention.

Next, a method for constructing the hologram having improved interference fringes, wherein the incident angle $\theta_i$ is equal to the diffraction angle $\theta_d$, will be described. Referring to FIG. 13, as can be seen from formula (6), the incident angle $\theta_i$ and the diffraction angle $\theta_d$ are given by the following formulae, $$\sin\theta_i = \frac{\lambda_2}{\lambda_1} \frac{r}{\sqrt{f_A^2 + r^2}} \quad (9)$$

$$\sin\theta_d = \frac{\lambda_2}{\lambda_1} \frac{R-r}{\sqrt{f_B^2 + (R-r)^2}} \quad (10)$$

where, $\lambda_1$ is the wavelength of construction wave of the hologram, and $\lambda_2$ is the wavelength of the reconstruction wave of the hologram.

As shown above, the condition of the maximum margin for the allowance value with respect to the eccentricity of the axis is given by formula (7). Accordingly, the condition in which incident angle $\theta_i$ is equal to the diffraction angle $\theta_d$, and simultaneously, the maximum margin of the eccentricity is given by formula (7), is obtained when the following conditions are met:

$$f_A = f_B, \ R = 2r \quad (11)$$

based on formulae (7), (8), (9), and (10).

As the conditions in (11), clearly show, when the hologram is obtained by interference of an object wave light beam and a reference wave light beam, the object wave light beam having a diverging spherical wave front and the reference wave light beam having another diverging spherical wave front must be provided at a symmetrical position with respect to the normal line N-N' (FIG. 13) of the surface of the hologram disk, at the incident position P$_4$ of the reconstruction beam 5.

In the first embodiment, since these light beams, both having a the diverging spherical wave front, are provided at asymmetrical positions with respect to the normal line of the surface of the hologram disk, the utilization efficiency of the light beam between the reconstruction beam and the scanning beam is about 15 percent. This is because the incident angle does not satisfy the so-called Bragg condition. Therefore, according to this embodiment, a utilization efficiency of the light beam of about 75 percent is obtained, since the Bragg condition is satisfied by the symmetrical arrangement of both light beams.

Figure 14:
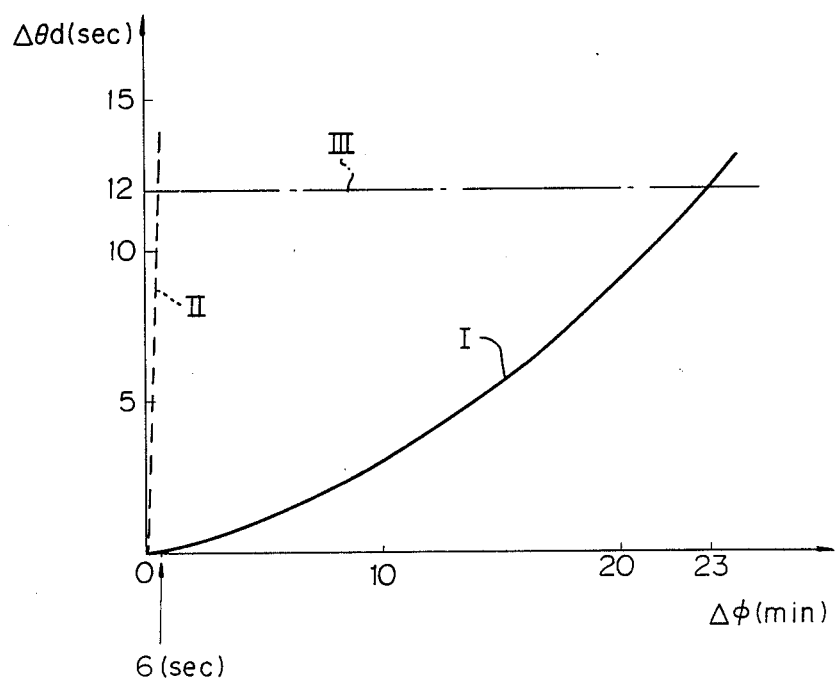
FIG. 14 is a graph of the relationship between the change in the diffraction angle and the change in the hologram disk angle orientation due to wobble in comparison with the conventional method using the multifaceted rotating mirror.

Referring to FIG. 14, the longitudinal axis indicates the deflection angle $\Delta\theta_d$ (sec) of the diffraction angle $\theta_d$, and the transverse axis indicates the deflection angle $\Delta\phi$ (min) of the surface of the hologram disk. Curve I (solid line) indicates the present invention, and curve II (dotted line) indicates the conventional method using a multifaceted rotating mirror. The chain-dotted line III indicates the limitation target value (12 sec) of the allowance obtained by the calculation of the angle $\Delta\theta_d$. As is obvious from the graph, the allowance value of the deflection angle $\Delta\phi$ for the target value (12 sec) is 23 (min) according to the present invention, while, according to the conventional method, the deflection angle $\Delta\phi$ is 6 (sec). Accordingly, the allowance value for the deflection angle $\Delta\phi$ in the present invention provides a sufficiently large margin.

Figure 15:
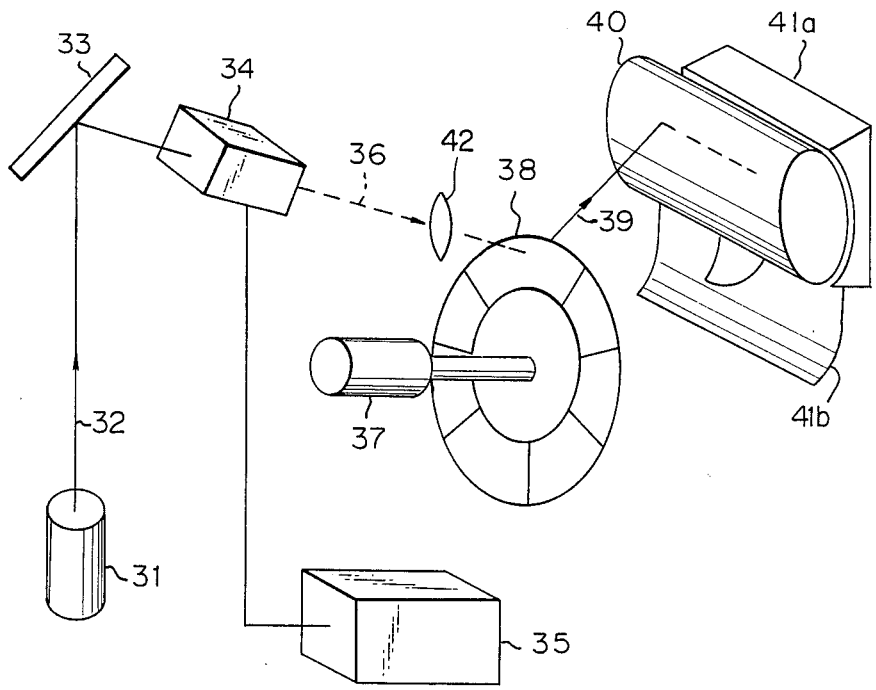
FIG. 15 is an illustration of a light beam scanning apparatus according to an embodiment of the present invention when used in a laser printer.

Next, a method and apparatus for scanning the laser beam using a hologram having improved interference fringes, according to the present invention, and used in a laser printer, will be explained. FIG. 15 is an illustration of a light beam scanning apparatus (hologram scanner) used in a laser printer. Referring to FIG. 15, reference numeral 31 denotes a laser source, 32 a reconstruction beam, 33 a mirror, 34 a light modulator, 35 a control unit, 36 a modulated reconstruction beam, 37 a motor as a shifting means, 38 a hologram disk, 39 a scanning beam, 40 a photo sensitive drum, 41a a developer, 41b a printed sheet and 42a converging lever.

A hologram is previously constructed on the hologram disk 38 as shown by the hologram in FIGS. 8 and 9(A), 9(B), and 13. The hologram disk 38 is rotated by the motor 37 as a shifting means for the scanning beam. The reconstruction beam 32 emitted from the laser source 31 (having a freely adjustable wavelength) is reflected by the mirror 33 and then enters the light modulator 34. The light modulator turns the incident light beam ON or OFF in accordance with a control signal. The control signal is supplied from the control unit 35. The control unit 35 generates control signals corresponding to white and black patterns when an image to be printed is equally divided in the horizontal direction. The modulator 34 outputs the modulated reconstruction beam 36 by modulating the reconstruction beam 32 using the control signal.

As explained above, this output beam 36 is irradiated toward the hologram disk 38 which is rotated by the motor 37. The rotation of the hologram disk 38 distracts the modulated reconstruction beam 36 as the scanning beam 39, based on the above principles. The scanning beam 39 scans across a straight line on the photo-sensitive drum 40. The photo-sensitive drum is sensitive to this beam and an electrostatic latent image is formed on its surface. The photo-sensitive drum 40 having the latent image on its surface rotates in the direction indicated by the arrow. The developer 41a develops and fixes the latent image on the printing sheet 41b on the drum. Thereby characters to be printed, as determined by the control unit 35, are printed on a fixed medium (printing sheet 41b).

We claim:

1. A method for producing a scanning light beam, comprising the steps of:
   (a) forming a hologram on a rotatable disk having a rotation axis by:
      (a1) irradiating a reference wave light beam from a first point light source located on the rotation axis at a first predetermined distance from the rotatable disk to provide a construction wave light beam having a diverging spherical wave front;
      (a2) irradiating an object wave light beam from a second point light source, located at a second predetermined distance from the rotatable disk and a third predetermined distance from the rotation axis thereof, to produce another construction wave light beam having a diverging spherical wave front and a first wavelength; and
      (a3) causing interference between the reference and object wave light beams to produce interference fringes having a spatial variation of spatial frequency, the spatial variation including a minimum rate of change of the spatial frequency;
   (b) rotating the rotatable disk after forming the hologram therein; and
   (c) directing a reconstruction beam onto the rotatable disk simultaneously with said rotating in step (b) to produce the scanning light beam, the reconstruction beam having a second wavelength longer than the first wavelength and enabling the scanning light beam as output from the rotatable disk to be directly usable in straight-line scanning, the reconstruction beam being incident on the rotatable disk in the vicinity of the minimum rate of change of the spatial frequency.

2. An apparatus for producing a scanning light beam, comprising:
   a rotatable disk having a rotation axis and containing a hologram obtained by interference of a reference wave light beam and an object wave light beam, each of the reference and object wave light beams having a diverging spherical wave front, the reference wave light beam having been produced by a first point light source located on the rotation axis at a first predetermined distance from the rotatable disk and the object wave light having been produced with a first wavelength by a second point light source located at a second predetermined distance from the rotatable disk and a third predetermined distance from the rotation axis thereof, the hologram having interference fringes having spatial variation of spatial frequency, the spatial variation including a minimum rate of change of the spatial frequency;
   a light beam source operable to generate a reconstruction beam for irradiating said hologram, the reconstruction beam having a second wavelength longer than the first wavelength and being incident on said rotatable disk in the vicinity of the minimum rate of change of the spatial frequency of the interference fringes of the hologram; and
   rotating means for rotating said rotatable disk to shift the hologram and obtain a scanning light beam directly usable in straight line scanning.

3. A method as claimed in claim 1,
   wherein the first and second predetermined distances are substantially equal, and
   wherein step (a2) comprises positioning the second point light source along a first line parallel to the rotation axis at the third predetermined distance therefrom, the hologram being substantially equidistant from the rotation axis and the first line.

4. An apparatus as recited in claim 2, wherein the first and second predetermined distances are substantially equal and the first and second point light sources are arranged symmetrically with respect to a normal line perpendicular to the rotatable disk and passing through the minimum rate of change of the spatial frequency of the hologram.

5. An apparatus as recited in claim 4, wherein the said light beam source is operable to direct the reconstruction beam, independently of the object wave light beam and the reference wave light beam, to form an angle of incidence ($\theta_i$) of the reconstruction beam on the rotatable disk and an angle of diffraction ($\theta_d$) meeting the following equations:

$$\sin \theta_i = \frac{\lambda_2 \, r}{\lambda_1 \sqrt{f_A^2 + r^2}}$$

$$\sin \theta_d = \frac{\lambda_2 \, R - r}{\lambda_1 \sqrt{f_B^2 + (R - r)^2}},$$

where $\lambda_1$ is the first wavelength, $\lambda_2$ is the second wavelength, r is a distance from the rotation axis to a point of incidence of the reconstruction wave light beam, $f_A$ is the first predetermined distance, $f_B$ is the second predetermined distance and R is the third predetermined distance.

6. An apparatus as recited in claim 5,
   wherein at least one of the reference and object wave light beams are produced by an argon laser, and
   wherein said light beam source comprises a semiconductor laser.

7. An apparatus as recited in claim 6, further comprising means for producing printed output using the scanning light beam.

8. An apparatus as recited in claim 5, further comprising means for producing printed output using the scanning light beam.

9. A method as claimed in claim 8, further comprising the steps of:
   (d) providing a transparent disk having a center axis to form the hologram therein;
   (e) positioning the first point light source substantially along the center axis of the transparent disk and positioning the second point light source along a first line perpendicular to the plane of the transparent disk, the hologram being substantially equidistant from the center axis and the first line.

10. An apparatus as recited in claim 9, further comprising means for producing printed output using the scanning light beam.

11. An apparatus as recited in claim 4, further comprising means for producing printed output using the scanning light beam.

12. An apparatus as recited in claim 2, wherein the said light beam source is operable to direct the reconstruction beam, independently of the object wave light beam and the reference wave light beam, to form an angle of incidence ($\theta_i$) of the reconstruction beam on the rotatable disk and an angle of diffraction ($\theta_d$) meeting the following equations:

$$\sin \theta_i = \frac{\lambda_2 r}{\lambda_1 \sqrt{f_A^2 + r^2}}$$

$$\sin \theta_d = \frac{\lambda_2 R - r}{\lambda_1 \sqrt{f_B^2 + (R - r)^2}},$$

where $\lambda_1$ is the first wavelength, $\lambda_2$ is the second wavelength, r is a distance from the rotation axis to a point of incidence of the reconstruction wave light beam, $f_A$ is the first predetermined distance, $f_B$ is the second predetermined distance and R is the third predetermined distance.

13. An apparatus as recited in claim 12,
    wherein at least one of the reference and object wave light beams are produced by an argon laser, and
    wherein said light beam source comprises a semiconductor laser.

14. An apparatus as recited in claim 13, further comprising means for producing printed output using the scanning light beam.

15. An apparatus as recited in claim 12, further comprising means for producing printed output using the scanning light beam.

16. An apparatus as recited in claim 2,
    wherein at least one of the reference and object wave light beams are produced by an argon laser, and
    wherein said light beam source comprises a semiconductor laser.

17. An apparatus as recited in claim 16, further comprising means for producing printed output using the scanning light beam.

18. An apparatus as recited in claim 2, further comprising means for producing printed output using the scanning light beam.

* * * * *

UNITED STATES PATENT AND TRADEMARK OFFICE
CERTIFICATE OF CORRECTION

PATENT NO. : 4,925,262                    PAGE 1 OF 2

DATED      : May 15, 1990

INVENTOR(S): Yamagishi et al.

It is certified that error appears in the above-identified patent and that said Letters Patent is hereby corrected as shown below:

FRONT PAGE [56] FOREIGN PATENT DOCUMENTS,
line 2, "54-10484   8/1979 Japan ." should be --54-104849   8/1979 Japan .--.

FRONT PAGE, Col. 2, -- Publications 1 and 3 are the same, but there is more information in the first publication than there is in the third publication. However, "Defletor" should be --Deflection-- in the first publication.

Col. 1, line 36, "reduce" should be --reduced--.

Col. 2, line 42, "4(a-b) illustrations" should be --4(a-b) are illustrations--.

Col. 5, line 16, "$\Delta y$ be" should be --$\Delta y$ to be--;

line 30, "$f(r_0)$" should be --$f'(r_0)$--;

line 44, "shows a" should be --is--.

Col. 6, line 7, "wavelength i.e." should read --wavelength, i.e.--.

UNITED STATES PATENT AND TRADEMARK OFFICE
CERTIFICATE OF CORRECTION

PATENT NO. : 4,925,262

DATED : May 15, 1990

INVENTOR(S) : Yamagishi et al.

It is certified that error appears in the above-identified patent and that said Letters Patent is hereby corrected as shown below:

Col. 7, line 28, "$\Delta\Phi$" should be --$\Delta\phi$--.

Col. 8, line 36, "the" should be deleted.

Col. 9, line 7, "lever." should be --lens.--;
line 26, "distracts" should be --diffracts--.

Col. 11, lines 14-23 (claim 9), should be deleted and the following claim should be inserted, which was inadvertently omitted by the Patent Office.

--9. An apparatus as recited in claim 4, wherein at least one of the reference and object wave light beams are produced by an argon laser, and wherein said light beam source comprises a semiconductor laser.--.

Signed and Sealed this

Ninth Day of July, 1991

Attest:

HARRY F. MANBECK, JR.

*Attesting Officer*          *Commissioner of Patents and Trademarks*